United States Patent [19]
Udelle et al.

[11] Patent Number: 5,517,946
[45] Date of Patent: May 21, 1996

[54] ANIMAL HAIR CONFINEMENT ENCLOSURE

[76] Inventors: Steven D. Udelle; Laura L. Udelle; Jessica J. Udelle, all of 26414 Barranquilla Ave., Punta Gorda, Fla. 33983

[21] Appl. No.: 491,043

[22] Filed: Jun. 19, 1995

Related U.S. Application Data

[63] Continuation-in-part of Ser. No. 196,700, Feb. 15, 1994, Pat. No. 5,460,121.

[51] Int. Cl.⁶ .................................................. A01K 13/00
[52] U.S. Cl. ........................................................ 119/83
[58] Field of Search ............................... 119/15, 19, 83, 119/86, 702, 706, 709, 710, 711

[56] References Cited

U.S. PATENT DOCUMENTS

| | | | |
|---|---|---|---|
| 2,865,329 | 12/1958 | Elliott | 119/83 |
| 2,976,841 | 3/1961 | Scheffer | 119/83 |
| 4,301,766 | 11/1981 | Piccone | 119/706 |
| 4,807,569 | 2/1989 | Leopold | 119/83 |
| 4,907,540 | 3/1990 | Reynolds | 119/86 |
| 5,176,105 | 1/1993 | Madden | 119/83 |
| 5,460,121 | 10/1995 | Udelle et al. | 119/83 |

*Primary Examiner*—Thomas Price

[57] ABSTRACT

An expandable animal hair confinement device comprising, a base 14 containing a series of recessed slotted openings 30 employing a pair of vertical sides 45 with slideable rails 51. One of several arched cover portions 47 are mated to the vertical sides to house the entire body of an animal of a particular size. The base 14 contains a series of reccessed slotted openings 19, and the vertical sides 45, and arched covers 47 contain bristles 12 throughout one side of their surfaces.

2 Claims, 8 Drawing Sheets

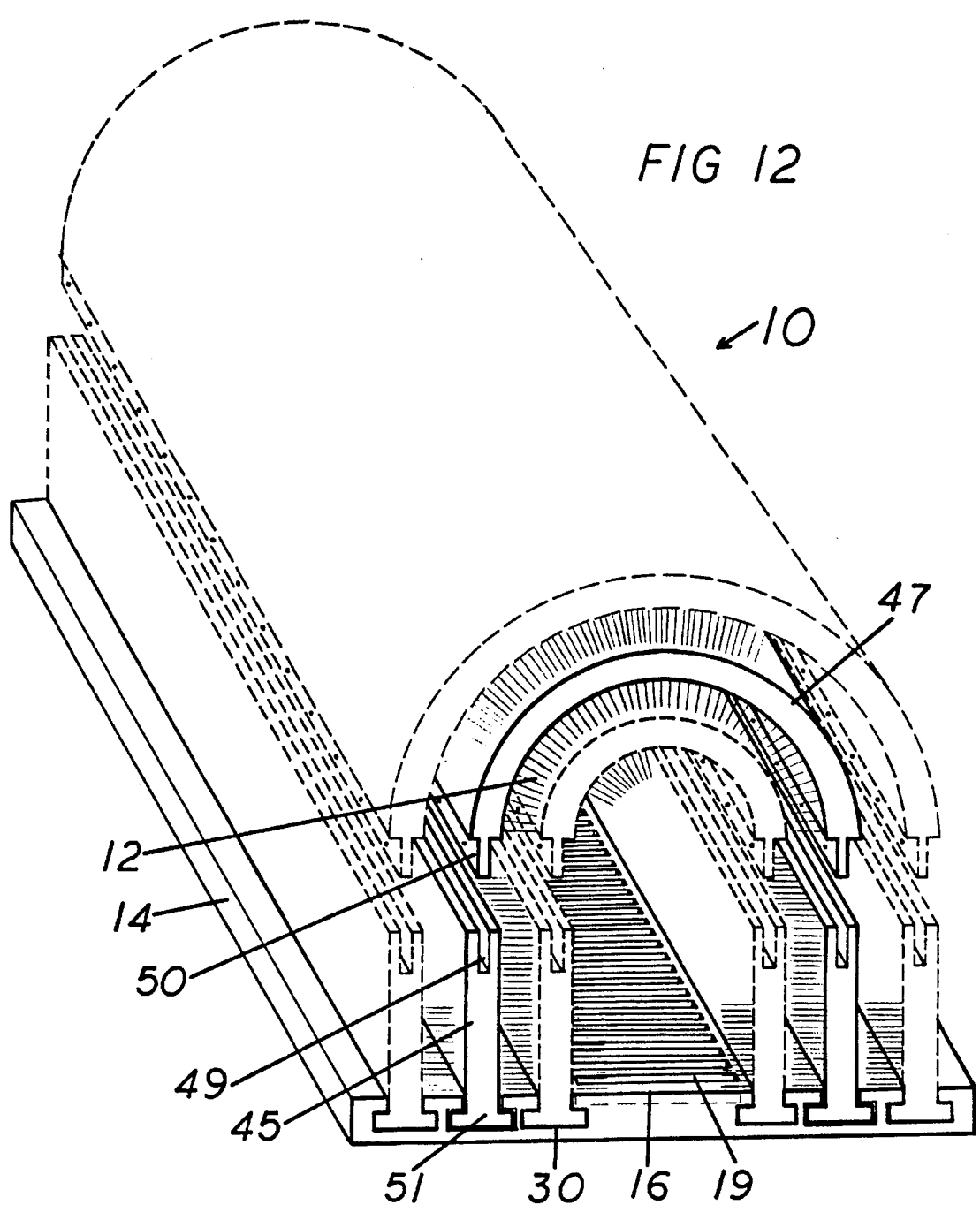

ANIMAL HAIR CONFINEMENT ENCLOSURE

This invention has been filed under the Disclosure Document Program as Document No. 345,276 and is a continuation in part of Ser. No. 08/196,700 filed Feb. 15, 1994 now U.S. Pat. No. 5,460,121.

BACKGROUND OF THE INVENTION

1. Field of the Invention

The present invention relates generally to safe-guarding the home environment from the unhealthy distribution of domesticated animal hair, dander, dirt, flea eggs, lice, and ticks, particularly by trapping and confining within its interior, the unwanted pollutants and debris.

2. Background—Discussion of the Prior Art

With the current economy requiring two incomes to support a higher standard of living, more couples find that their animals are left at home unattended for longer periods of time. Most families more or less live with the problem of animal hair since there are no effective devices available on the market to solve the problem. The first problem is the constant evidence of animal hair throughout the home. The second problem is that certain parts of the upholstered furniture become rubbing posts, leaving accumulations of hair as well as the dirt from the animal's body. While many pets are strictly confined to the house, there are many pets permitted to be outdoors. This outdoor freedom not only adds additional dirt to the body hair, but the animal can carry fleas, lice, and ticks to the interior of the living environment. The problem is particularly bad in the sub-tropics where flea and tick infestation is rather prevalent.

There are many devices on the market for self-grooming of animals. Among the prior art devices is a device that attaches to the lower part of a wall. This device only provides another additional location for hair deposits, mainly on the floor, along with soiling of the walls from the animal's body. It is well known that during any type of brushing action performed by hand or self-brushing by an animal, a significant amount of hair falls from even the best brush, but considerably more so from the animal's self-brushing efforts.

Prior art devices are basically directed to two types of self grooming devices, one type is identified as a walk-through or crawl-through device. These are devices that the animal may walk or crawl through and brush, rake, or scratch itself during the walk-through process. These are shown for example in U.S. Pat. Nos. 2,865,329 to Elliot, 2,976,841 to Scheffer, and 4,301,766 to Piccone. The patents to Elliot and Scheffer are very similar in construction and purpose. It was found that with a device similar to Scheffer, it was necessary to add catnip as an incentive to promote interest. The results, after one month of observation, revealed an occasional penetration of the animal's body to the shoulders, at most, while in the act of scratching or rubbing on the grooming medium. Close examination of the floor below the device showed animal hair available for dispersion by air movement.

The natural instinct most pets have to conceal, or hide themselves in various places or recesses, is irresistible as long as these places or recesses are not threatening to their inherent psychology. The prior art is basically directed to two types of self-grooming devices. U.S. Pat. No. 4,301,766 to Piccone discloses a furniture device for cats comprising a basic housing design being generally rectangular and defining a plurality of circular apertures in the sides. Each aperture is designed to receive a frame which is annular and includes a grooming device such as a brushing or combing device extending inwardly across the opening. Individual structures are attached to each other. Brushes or combs do not effectively hold all hair yielded by an animal's coat. As an animal enters an opening containing a brush, substantial hair will fall from the exterior of the device to the floor. If the animal exits through the same opening with the same brush, hair already attached to the brush can be rolled forward on the brush in small clumps and fall to the floor if the brushes are not keep clean. These brush widths are very limited in retaining hair because of their lack of depth. As the animal enters the cubicle, passes through the brush, and rests on the cubicle floor, the loose hairs on the cubicle floor will readily adhere to the animal's under body and be carried out when the animal exits. There is no brushing means at the bottom of the annular rings to grip the hair as the animal exits the cubicle. This device does not exhibit the ability to successfully confine any significant amounts of hair, dander, dirt, flea eggs, fleas, lice, or ticks.

U.S. Pat. No. 4,807,569 to Leopold discloses a grooming device comprising a toothed plate securable to a wall, corner or other supporting fixture. An aperture plate having holes positioned to correspond to the location of the teeth on the toothed plate mesh with the teeth and cover a portion of each tooth for providing added strength to and stiffening of each tooth when closed, a teeth straightening function upon opening and closing the two plates and a teeth cleaning function upon opening of the plates. Although the teeth do contain some animal hair, most of the hair falls to the floor below the device, ready to become scattered by a simple passage of a human stirring the air or by use of a ceiling fan.

U.S. Pat. No. 4,907,540 to Reynolds discloses a device for removal of loose hair and fur balls from a cat having a frame mounted to a wall. Attached to the frame are two planar surfaces with catnip receptacles and a plurality of bristles. The plurality of bristles are of appropriate number, placement and size to catch and hold a cat's loose fur.

U.S. Pat. No. 5,176,105 to Madden discloses a grooming apparatus having a base portion, and a twisted wire connected to the base portion. Brush bristles are retained by and extend radially from the spiral twist of the wire for brushing a live animal as it passes against the bristles. As in the other prior art devices, any hair, debris or pollutants that may fall from the animal, will remain on the floor until the animal, or a draft of air scatters it throughout the environment.

In summary, none of the prior art devices have provided a positive solution to the above mentioned animal problems that seriously affects the many living environments where animals are kept.

SUMMARY OF THE INVENTION

Generally, the present invention comprises a structure in the form of a mailbox configuration. The interior of the enclosure supports a complete array of brush bristles or a rubbing medium throughout both vertical sides and top. The base of the enclosure has a plurality of recessed, slotted openings, which will allow surplus hair, dander, dirt, flea eggs, fleas, lice and ticks that might fall from rubbing medium, or animal, to fall to the bottom of these slotted openings for complete confinement to prevent carry out. In addition, a strip of plush carpeting is attached at both ends of the enclosure's base, to further the confinement of debris to the interior of the device and not the living environment.

It is therefore an object of the invention to materially enhance the human living environment of animal owners by reducing the amount of hair, dander, dirt and other airborne pollutants carried by domestic animals and associated with allergies.

It is another object of the invention to provide a device that would receive the entire body of an animal to insure entrapment of pollutants and debris.

It is a still further object of the invention to provide a device that can be made in many sizes, inexpensively, to accommodate any requirement.

Still another object of the invention is to provide a device constructed as one integral piece, compromising the enclosure, rubbing medium, and a base having a plurality of recessed, elongated slots for debris confinement and "paw-gripping".

Yet another object of the invention is to provide a device that serves as a substitute rubbing medium to protect furniture or other areas of the home.

Other advantages of the present invention will be readily understood by reference to the following detailed description when considered in connection with the accompanying drawings.

BRIEF DESCRIPTION OF THE DRAWINGS

FIG. 12 is an exploded perspective view showing several sizes in dashed lines.

DETAILED DESCRIPTION OF THE INVENTION

Figure 1:
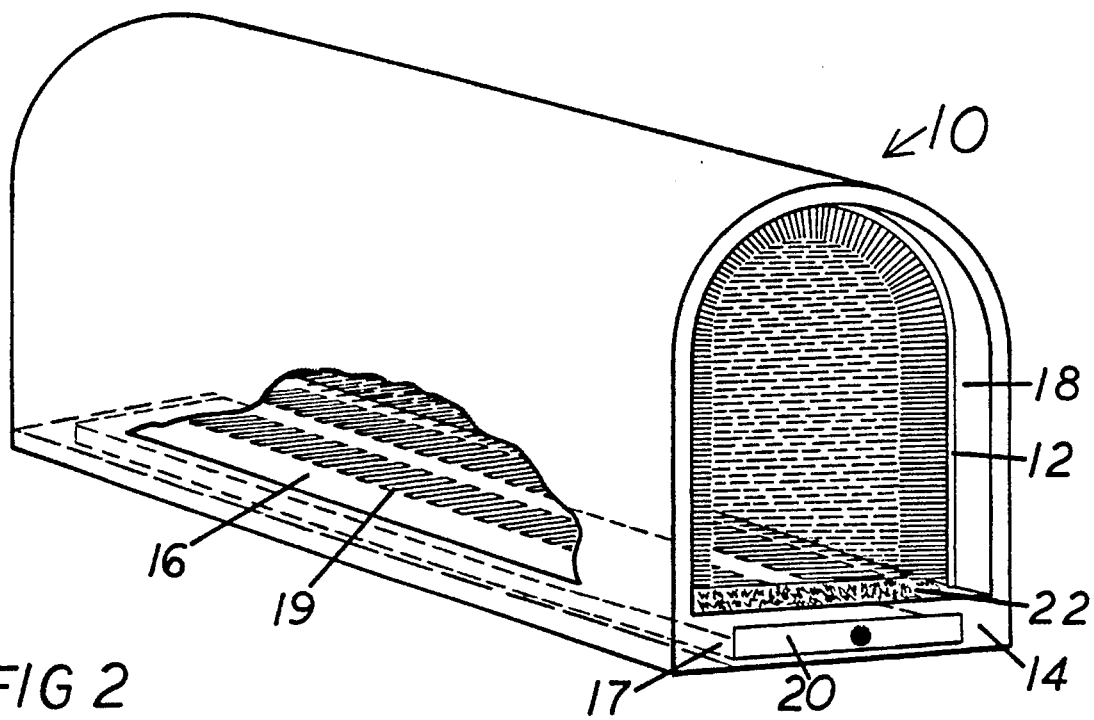
FIG. 1 is a perspective view, partially in section, of a preferred embodiment of the invention.
Figure 2:
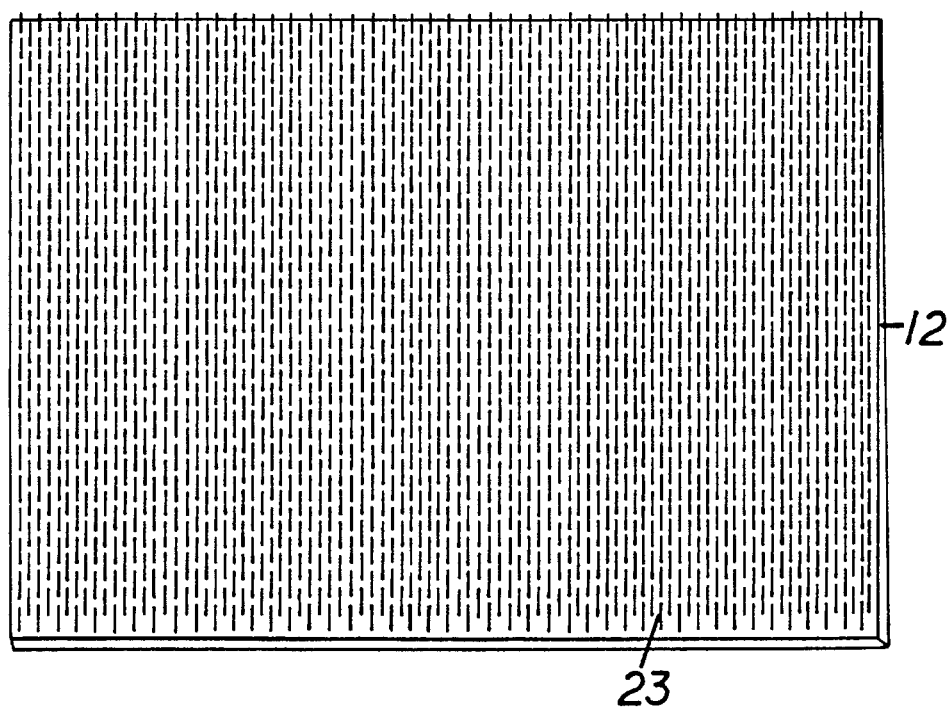
FIG. 2 is a perspective view of a flexible rubbing medium of the invention.

FIGS. 1 and 2 are perspective views of the animal hair confinement enclosure of the present invention and comprises a rigid enclosure 10, open at both ends, a flexible rubbing medium 12 that is removable, a base 14, a slotted or perforated base floor 16 supported in the base housing 14. The front of base 14 contains a slot 17 to accommodate a removable debris tray or drawer 20. A rubbing medium void area 18 is located at each end of the enclosure 10 and a narrow strip of plush carpeting 22 is attached to each of the extreme ends of the perforated base floor 16.

Rigid enclosure 10, formed in the shape of a mailbox, is sufficiently long to receive the entire animal, except the tail, to ensure the confinement of all debris released by the animal's rubbing act. Enclosure 10 may be formed from plastic or metal or other practical material, and sized to fit the average cat or dog size. Larger versions may be formed to accommodate larger animals. To simplify the vacuuming and sanitizing of accumulated animal debris from the brushing or rubbing medium 12, medium 12 is made removable by simply sliding it from the enclosure 10. Base floor 16 is perforated or slotted to keep the floor 16 surface clear by passage of the animal debris through the slotted or perforated openings 19. The slotted or perforated openings 19 also provide a means for "paw-gripping".

Base 14 is designed to support the enclosure 10. the perforated base floor 16, and to house the debris tray 20. Debris tray 20, fits into tray guide 17, located below perforated base floor 16, and collects and confines the animal debris fallen from the brushing or rubbing medium 12 for easy disposal. The debris tray 20 may also be treated with flea powder to provide an added benefit of killing fleas and their eggs. The rubbing medium 12 is shorter than the enclosure 10 to provide a strip or void 18 at each end of enclosure 10 to prevent hair and debris from falling to the outside of the enclosure 10 when the animal is ribbing or scratching near the openings of the device.

Rubbing medium 12 shown in a flat condition in FIG. 2, may be made in a sheet of plastic or carpeting or suitable material with bristles 23 that are of sufficient stiffness to provide the brushing comfort desired by the animal and to pull the loose hairs or debris from the animal. The bristles 23 may also be designed to release hair and debris when the animal departs. The bristles 23 may also be formed integrally with the backing when molding rubbing medium 12 from certain materials.

Figure 3:
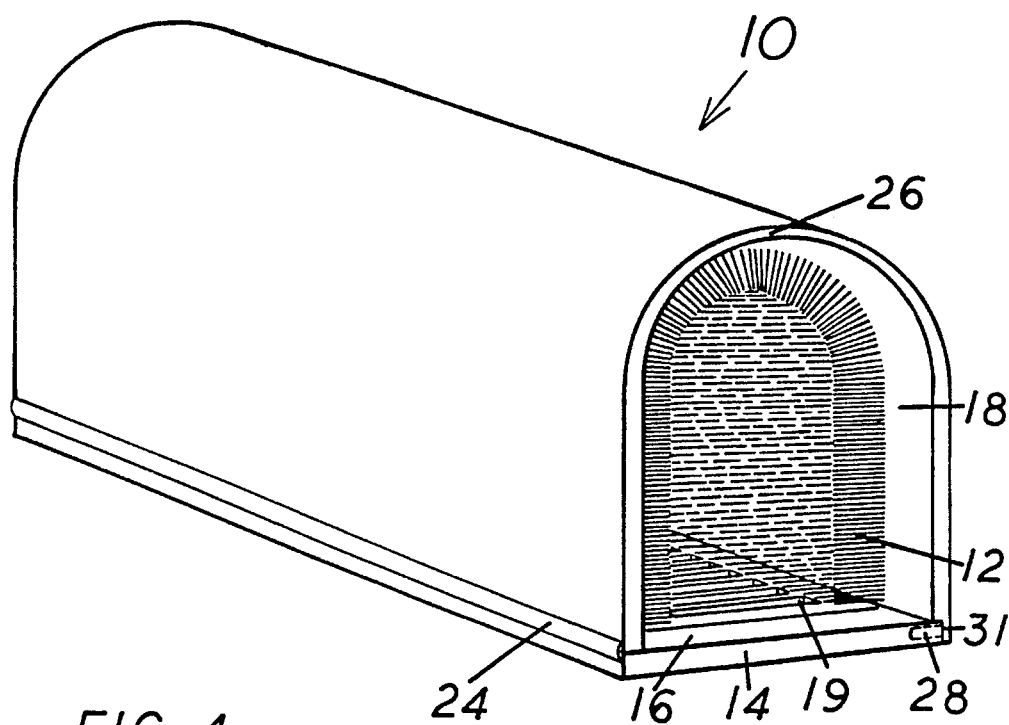
FIG. 3 is a perspective view of a second embodiment of the invention.
Figure 4:
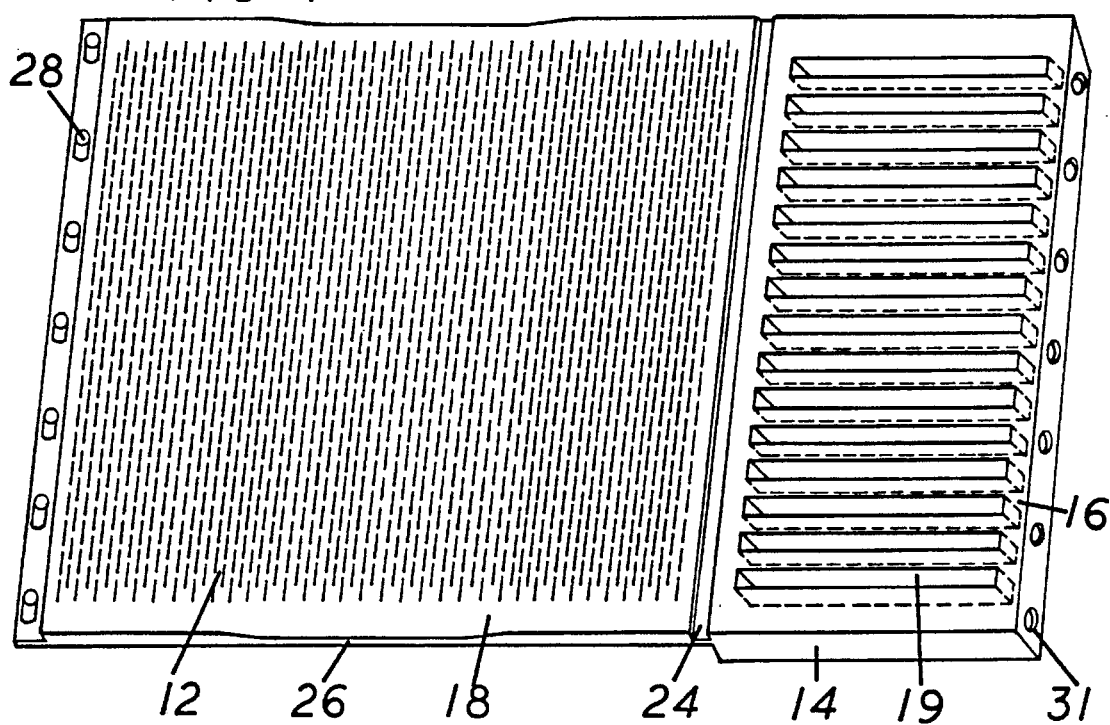
FIG. 4 is a perspective view of a disassembled second embodiment of the invention.

FIGS. 3 and 4 are perspective views of a second embodiment in an assembled and an unassembled form. A rigid base 14 having a slotted base floor 16 along its entire length. Said slotted base floor formed from a plurality of elongated openings 19. A plurality of attachment dowel openings 31 positioned along a first edge of said base 14. A flexible brushing medium 12 is provided. A flexible hinge or living hinge 24 attaches said brushing medium to an opposite second edge of said base. A plurality of attachment dowels are positioned along an edge of said flexible brushing medium. Each attachment dowel can be removably positioned in a respective attachment dowel opening, such that when assembled forms an enclosure having a mailbox configuration. The flexible brushing medium 12 further including a reduced thickness portion 26 to insure correct bending, curving or shaping when assembled. Elongated openings 19 in base 14 keep the floor clear of hair or debris by containing any fallen hair or debris from an animal. Further, the openings 19 allow for paw gripping when in use by an animal. A brushing medium void area 18 is provided to limit hair and debris from falling outside the device when an animal is rubbing near the ends, such that the void area does not grip any hair or debris from an animal.

Figure 5:
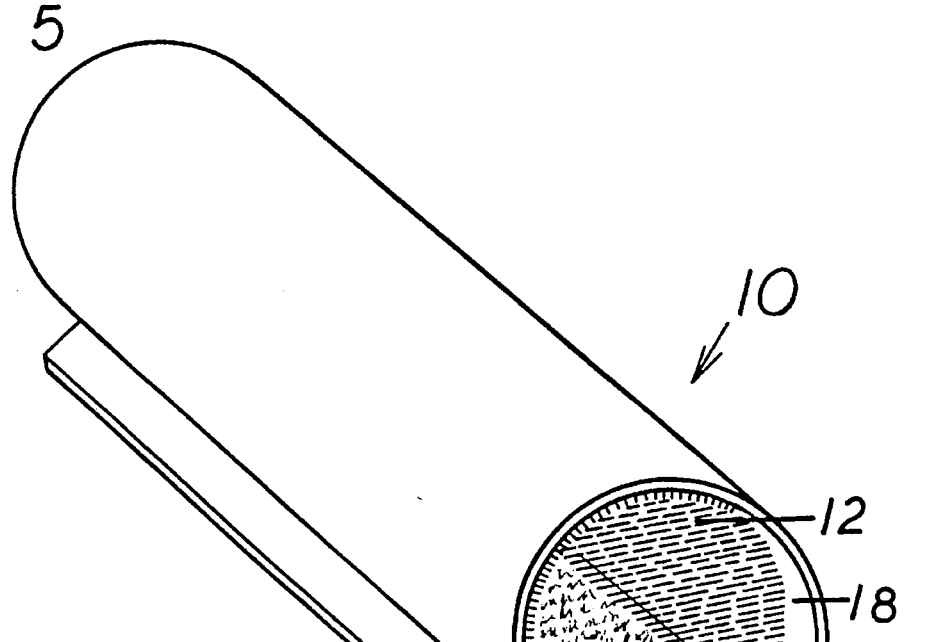
FIG. 5 is a perspective view of a third embodiment of the invention.

FIG. 5 is a perspective view of a third embodiment which comprises a tubular enclosure 10 and rubbing medium 12 as one integral unit, which may be inserted in or removed from the elongated guide tracks 31 of the base 14, a rubbing medium void area 18 and a strip of carpeting 22 the entire length of the base 14. This embodiment of enclosure 10 will house smaller animals such as hamsters, gerbils and mice in a practical manner. The rubbing medium 12 is an integral part of the enclosure 10 that traps and confines debris from the animal's rubbing motion. The base 14 is furnished with recessed, elongated tracks 31 for the attachment of the integrally made enclosure 10 and rubbing medium 12. The tracks 31 provide a convenient means for removing the tubular enclosure 10 for ease of cleaning. The plush carpet 22, extending the entire length of the base floor 14 is provided for debris retention and "paw-gripping".

Figure 6:
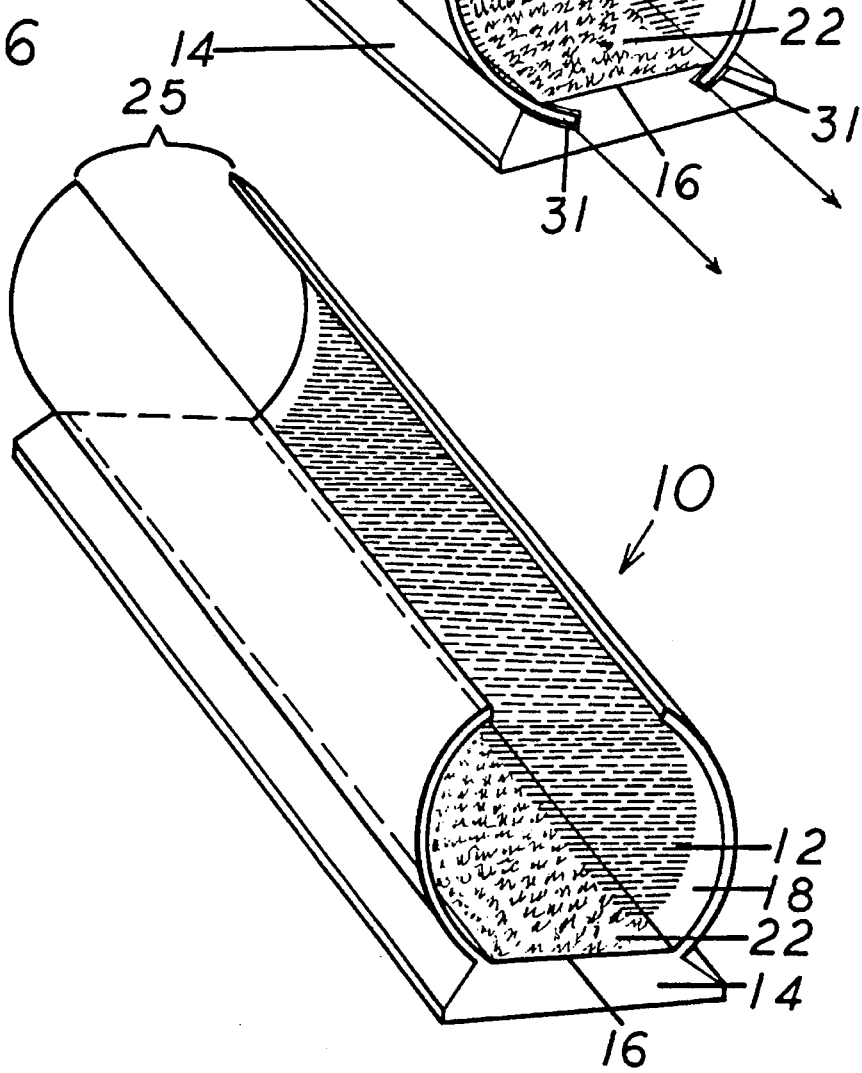
FIG. 6 is a perspective view of a fourth embodiment of the invention.

FIG. 6 is a perspective view of a fourth embodiment of the invention which comprises a rigid, tube-like enclosure 10 rubbing medium 12 and base 14 formed as one integral unit. The embodiment features an opening 25 of the uppermost portion of the enclosure 10 and a strip of plush carpeting 22 the entire length of the base floor 16 with a rubbing medium void area 18. The opening 25 is an elongated section removed from the top of the tubular or pipe enclosure 10, partially exposing the interior for human viewing and amusement as the animal uses the rubbing medium or for timid animals that will not use a completely enclosed space.

Figure 7:
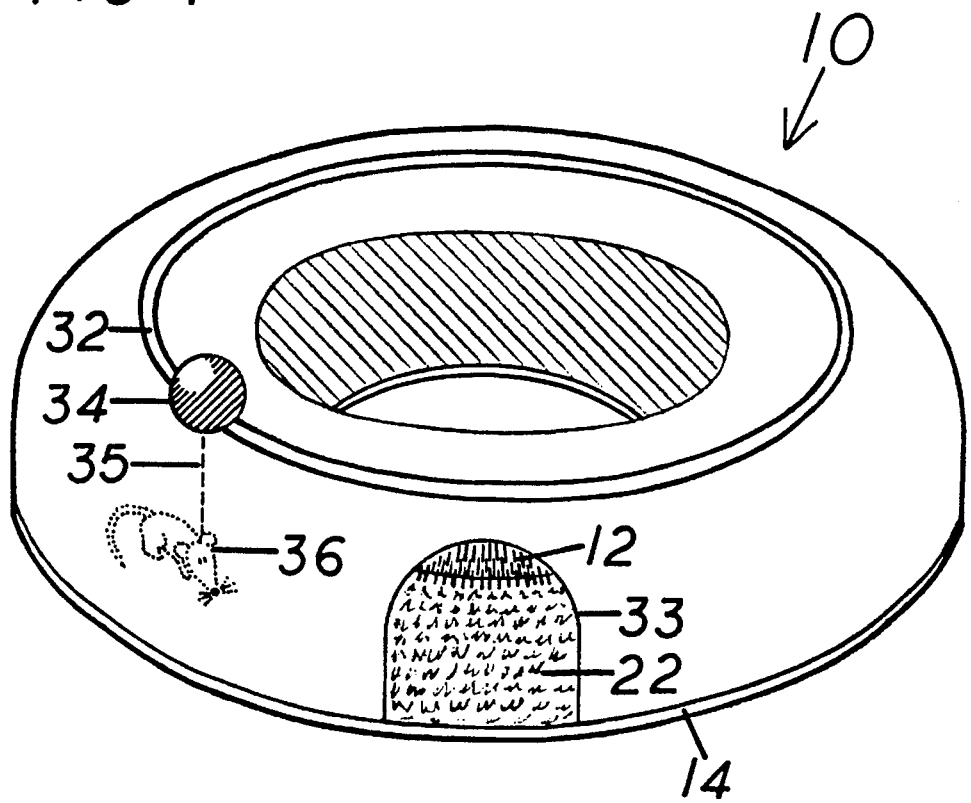
FIG. 7 is a fifth embodiment of the invention showing a "donut-shaped" enclosure.
Figure 8:
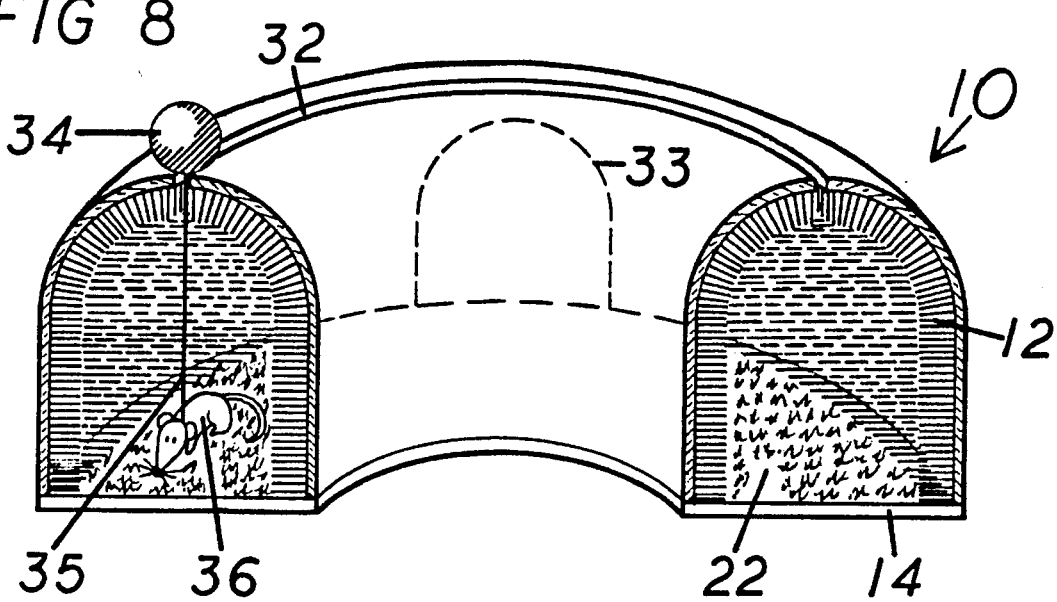
FIG. 8 is a perspective view, in section, of the embodiment shown in FIG. 7.
Figure 9:
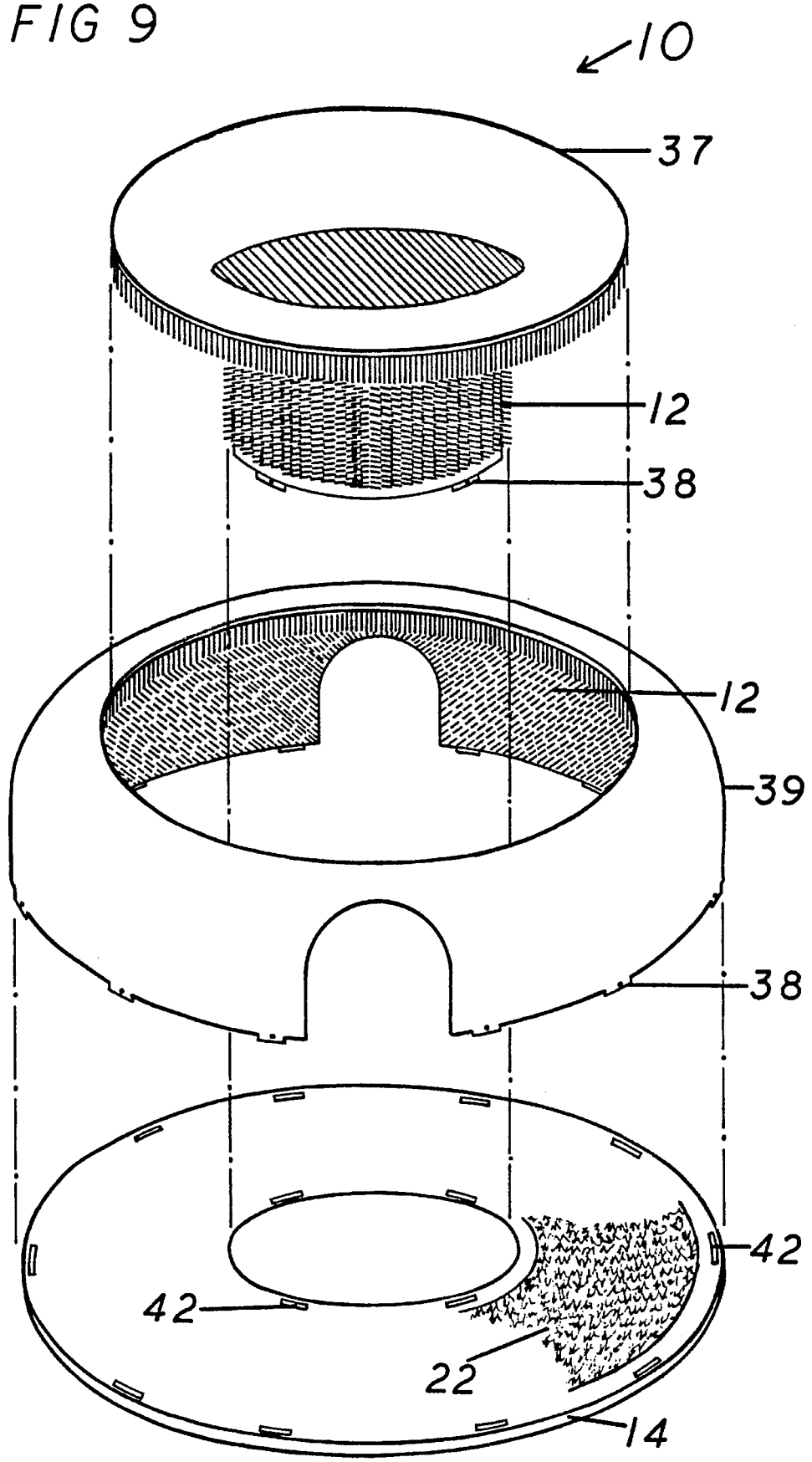
FIG. 9 is an exploded perspective view of the embodiment shown in FIG. 7.

FIGS. 7-9 are several views of a fifth embodiment which comprises a split circle or donut shaped enclosure 10 with a plurality of openings, including an open lure slot 32 and entrances 33. The circular shaped enclosure 10 comprises a circular base 14, a rubbing medium 12, permanently attached to the interior walls and top of enclosure 10, a carpet 22 fastened throughout the base floor 14, and an open slot 32 formed at the top end of the enclosure. A lure handle 34, for manipulating a lure 36 riding on a breakable string 35 is suspended through the open slot 32. As shown in FIG. 9, the enclosure 10 is shown in an exploded view with the inner enclosure portion 37, the outer enclosure portion 39, circular base 14, and rubbing medium 12, permanently installed therein to both sides and the top. Each of the parts of the enclosure 10, the inner enclosure portion 37 and the outer enclosure portion 39 are fastened to the base 14 with attachment blades 38 which are inserted into attachment blade openings 42 which are used as fasteners to firmly secure the enclosure 10 assembly to the base 14. A plush type carpet 22 is attached to the entire floor area of the base 14 for containing fallen debris from the rubbing animal as it embeds or adheres to the thick nap of the carpet. The carpet 22 also serves as a means for "paw-gripping".

Figure 10:
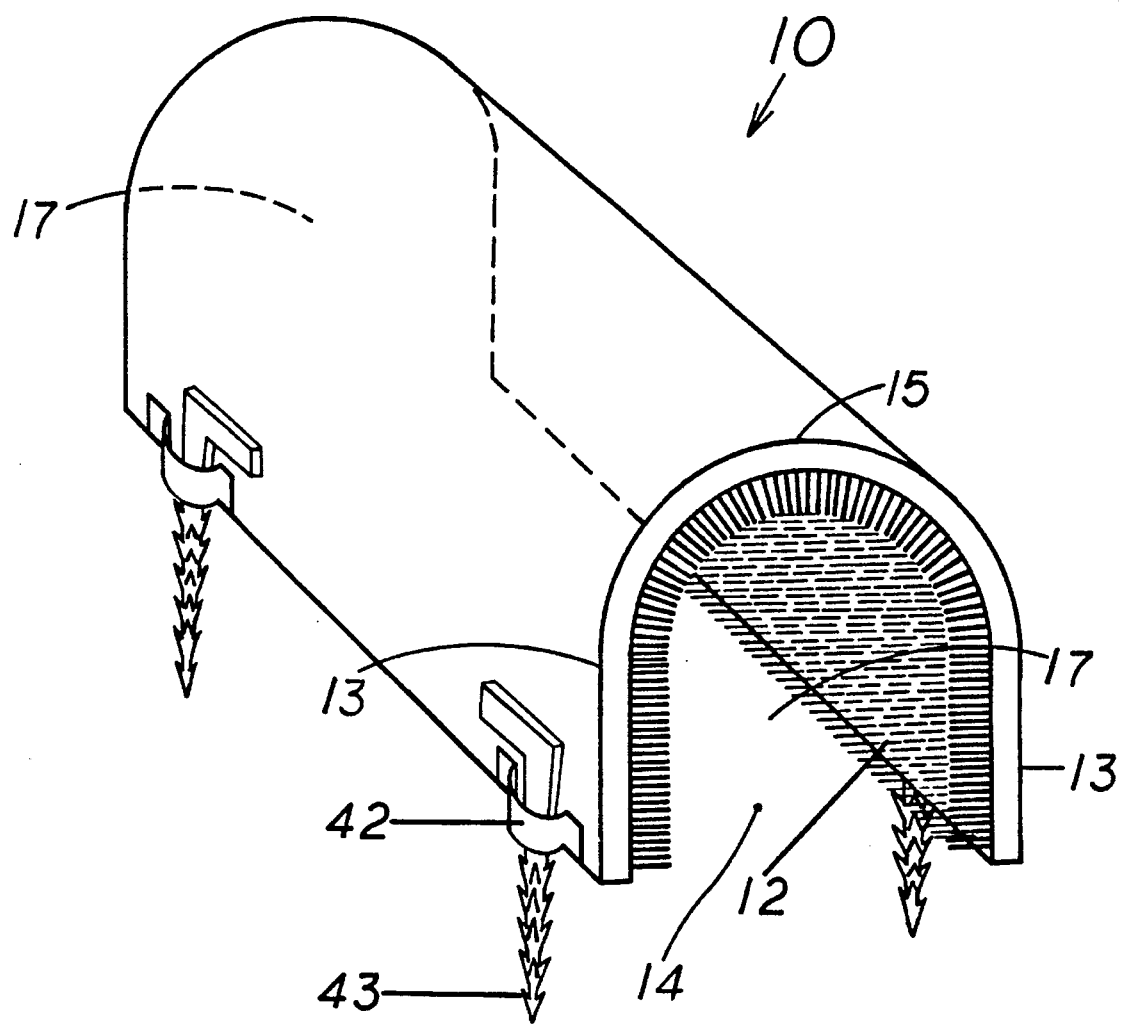
FIG. 10 is a perspective view of rigid, preformed rubbing medium with ground anchors.

FIG. 10 discloses a rigid, preformed enclosure or single sheet member 10 having opposite elongated sides 13 with an arcuate top 15 connected to the sides 13 having the shape of a mailbox configuration. A rubbing medium having a plurality of bristles 12 are connected to an interior surface of said enclosure. The enclosure further includes an open base or open bottom 14, and first and second open ends 17. Mounting brackets 42 are connected to the elongated sides 13 and removably receive a mounting peg 43 that allow the enclosure to be fixedly attached to a ground surface. Enclosure 10 may be anchored to the ground for outdoor domestic animals or animals in a zoo habitat for the benefit of maintaining a better coat by way of "self-scratching". This self-scratching allows for flea and tick removal, animal satisfaction, improvement in the animal's appearance and general well-being.

Figure 11:
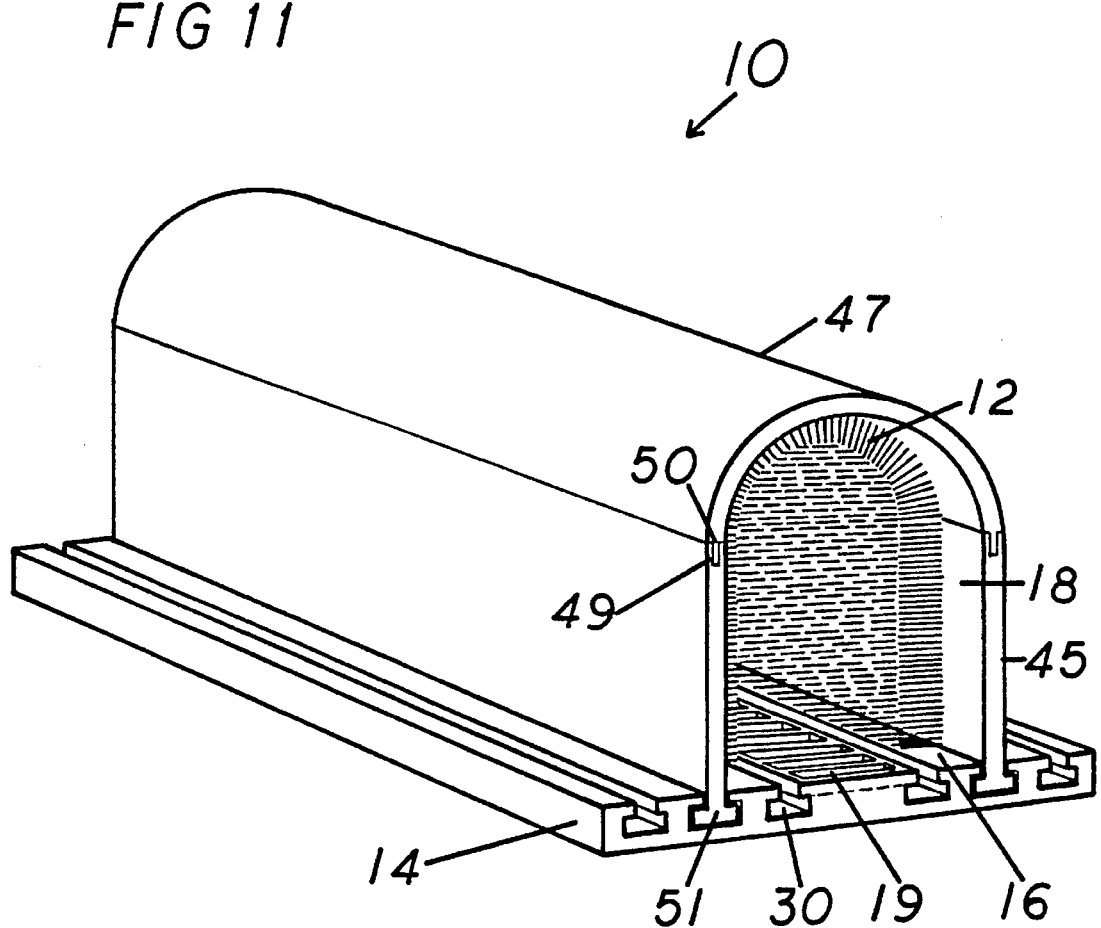
FIG. 11 is a perspective view of an expandable version of the invention.

FIGS. 11 and 12 disclose an animal enclosure 10 which may be expanded to accommodate many sizes of animals. The enclosure 10 includes a base 14 having a plurality of recessed elongated tracks 30. Enclosure 10 comprises straight portions 45 such that each straight portion forms an elongated side of said enclosure 10. A curved portion 47 forming a top of said enclosure. Each curved portion 47 having a pair of elongated parallel bottom edges, an insert edge 50 positioned on each bottom edge along its entire length. A rubbing or brushing medium 12 having a plurality of bristles are positioned about the enclosure interior. A rubbing medium void area 18 is provided at each end of said enclosure. A slotted base floor 16 having a plurality of slotted openings 19 that contain any fallen hair and/or debris from the animal. FIG. 11 depicts the enclosure 10 with a curved portion 47 sized for a medium size animal. Each straight portion 45 having a T-shaped rail 51 on its bottom edge such that the rail 51 is slidably received in a respective elongated track 30. Further, each straight portion having a slot 49 positioned on a top edge along its entire length. Each slot 49 receives a respective insert edge 50 of said curved portion.

FIG. 12 depicts an exploded view of the enclosure 10 with curved portion 47 sized for a medium size animal and the other two sizes are shown in dashed lines. To adjust the size of said enclosure 10, a larger curved portion 47 can be selected and connected to a respective pair of said straight portions 45. Additionally, each straight portion of a selected pair of straight portions can be positioned in a respective elongated track 30, said tracks can be positioned on said base at alternate spacings to accommodate the selected curved portion. A larger spacing would accommodate a larger animal. Conversely, a narrower spacing between a pair of elongated tracks and a smaller curved portion would accommodate a smaller animal.

Thus it has been shown that the animal hair confinement enclosure of the present invention can perform all of the objectives outlined above more completely than any of the prior art devices. While the specification contains many specific details, these should not be construed as limitations on the scope of the invention, but rather as examples of embodiments herein detailed in accordance with the descriptive requirements of law, it should be understood that the details are to be interpreted as illustrative and not in a limiting sense.

What is claimed is:

1. An animal hair confinement device comprising:
   a rigid base having a plurality of attachment dowel openings positioned along a first edge,
   a flexible brushing medium having a plurality attachment dowels positioned along an edge,
   a living hinge pivotally connecting said flexible brushing medium to an opposite second edge of said base, each attachment dowel removably positioned in a respective attachment dowel opening to form an enclosure.

2. An animal hair confinement device as claimed in claim 1, further comprising,
   said brushing medium having a reduced thickness portion to insure correct bending or curving of the brushing medium,
   said brushing medium having a reduced thickness portion to insure correct bending or curving of the brushing medium.

* * * * *

UNITED STATES PATENT AND TRADEMARK OFFICE
CERTIFICATE OF CORRECTION

PATENT NO. : 5,517,946
DATED : May 21, 1996
INVENTOR(S) : Udelle et al.

It is certified that error appears in the above-indentified patent and that said Letters Patent is hereby corrected as shown below:

In column 6, delete the last three lines of the claims that duplicate independent claim 2 - said brushing medium having a reduced thickness portion to insure correct bending or curving of the brushing medium.-

Signed and Sealed this

Twenty-eighth Day of October, 1997

Attest:

BRUCE LEHMAN

Attesting Officer        Commissioner of Patents and Trademarks